May 10, 1949.  A. L. MUNSON ET AL  2,469,979
APPARATUS AND METHOD OF MAINTAINING THE FRESHNESS
OF COUNTER DISPLAYED VEGETABLES
Filed June 4, 1948  3 Sheets-Sheet 1
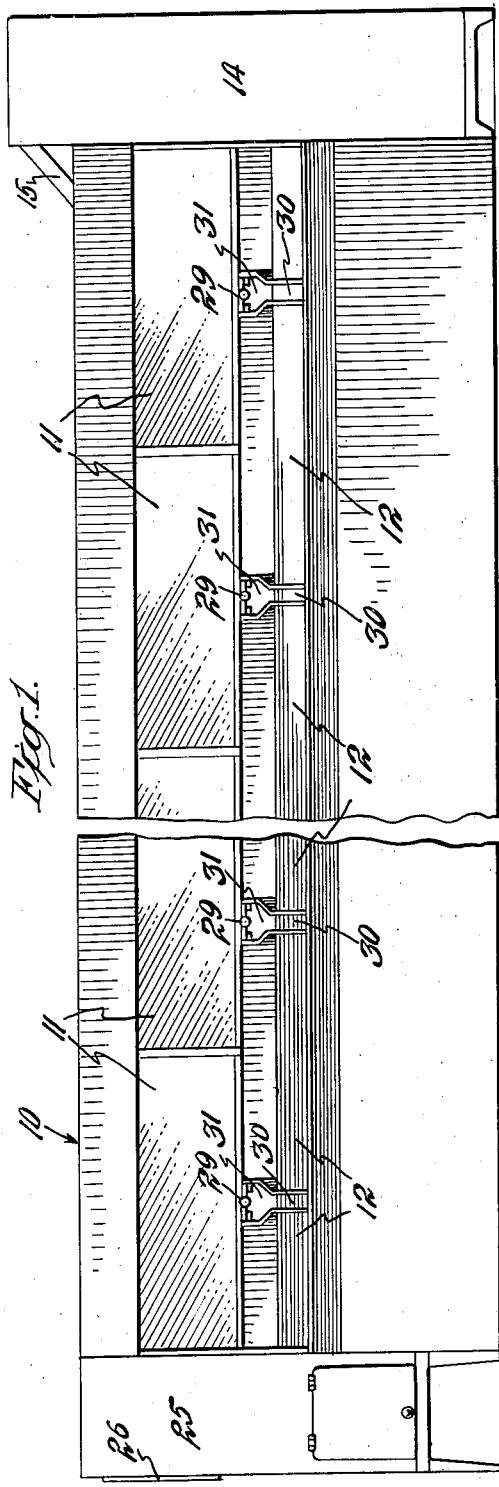
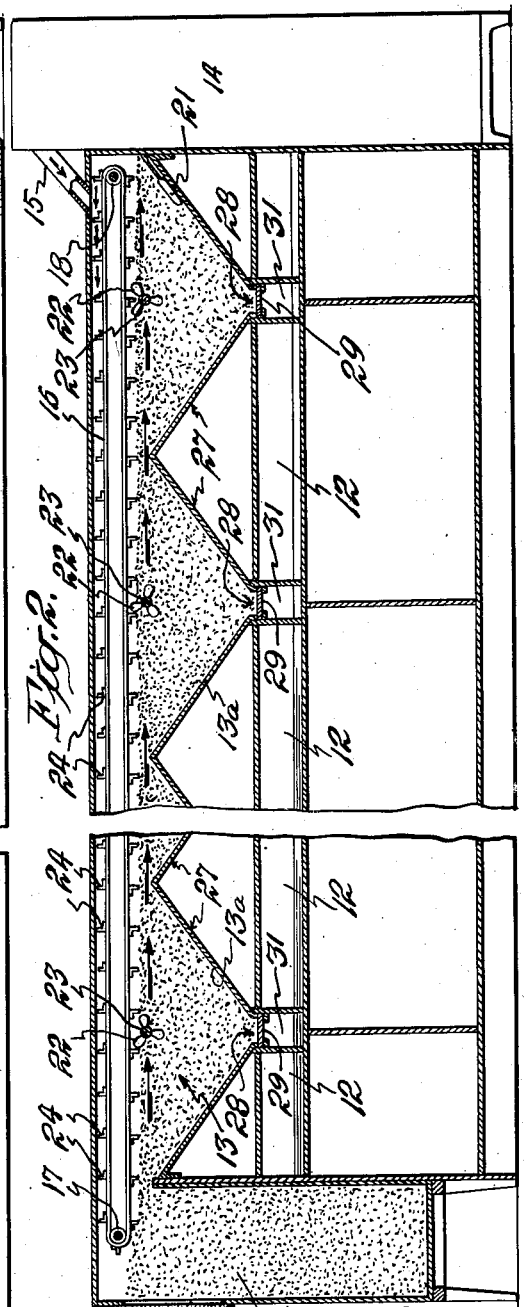
INVENTORS
ALEXANDER L. MUNSON
BY ROY C. FOLLETT
ATTORNEY May 10, 1949. A. L. MUNSON ET AL 2,469,979
APPARATUS AND METHOD OF MAINTAINING THE FRESHNESS
OF COUNTER DISPLAYED VEGETABLES
Filed June 4, 1948 3 Sheets-Sheet 2

INVENTORS
ALEXANDER L. MUNSON
BY ROY C. FOLLETT
ATTORNEY

May 10, 1949. A. L. MUNSON ET AL 2,469,979
APPARATUS AND METHOD OF MAINTAINING THE FRESHNESS
OF COUNTER DISPLAYED VEGETABLES
Filed June 4, 1948 3 Sheets-Sheet 3

INVENTORS
ALEXANDER L. MUNSON
BY ROY C. FOLLETT

ATTORNEY

Patented May 10, 1949

2,469,979

UNITED STATES PATENT OFFICE 2,469,979

APPARATUS AND METHOD OF MAINTAINING THE FRESHNESS OF COUNTER DISPLAYED VEGETABLES

Alexander L. Munson, Port Washington, and Roy C. Follett, Garden City, N. Y.

Application June 4, 1948, Serial No. 31,014

10 Claims. (Cl. 62—37)

This invention relates to crushed or flaked ice and more specifically to a method and device for the preservation of fresh vegetables and other perishable commodities while displayed on store counters and the like.

Food experts, researchers and large-scale grocery merchandisers recognize it to be a fact that unless fresh vegetables are immediately iced, a substantial part of the food value, taste and life-sustaining vitamin content is lost. Furthermore, deterioration due to heat and loss of moisture while the vegetables are displayed in giant markets has a deleterious effect on the food value and vitamin content of the commodities. (The preservation of freshness in vegetables and fruits from harvest to consumption, by E. P. Brasher, G. M. Gilligan, C. W. Woodmansee, and E. M. Rahm, Del. Argic. Exp. Stat., Newark, Del., reprinted from Fruit Prods. Journal and Amer. Food Man., Feb. 1946, vol. 25, No. 6, pages 168–170; Use of crushed ice in displaying vegetables, by Mary Brown Patton, reprinted from Farm and Home Research, July-Aug. 1947, vol. 32, No. 247, Ohio Agric. Exp. Stat., Worster, Ohio). The life of freshly picked vegetables is relatively short and when exposed to an artificially warm and dehydrating atmosphere and handling while displayed for sale become rapidly withered with loss of vitamin content and unsightly in appearance.

Certain of the large group stores pioneered the movement toward packing perishable vegetables in flaked or cracked ice immediately after picking and maintaining the vegetables in an environment of ice during shipment directly to the super-markets for display and sale (Effect of crushed ice refrigeration on conservation of vitamin C content and on retention of weight of Ohio grown vegetables, by Mary Brown Patton, Dept. of Home Economics, Ohio Agric. Exp. Stat. and Leslie H. Miller, Dept. of Mathematics, Ohio State U., Columbus, Ohio, May 6, 1946, reprinted from Food Research, 1947, vol. 12, No. 3, pages 222–228 and Streamlined distribution of sweet corn, by Prof. Grant B. Snyder of Mass. State College concerning results of an experiment in direct farm to store delivery of sweet corn, conducted during 1946 by the A. & P. Food Stores, Mass. State College County Agricultural Agents and three western Mass. growers). However, in most cases no further icing is attempted during the shelf life of the vegetables with the obvious result that within a few hours and while displayed in a hot store they quickly lose vital vitamins and begin to wilt and eventually become unsaleable.

A primary object of this invention is to supply a method and device for maintaining the vegetables, fish or the like in a fresh condition while displayed on store counters until delivered personally to the customer and thereafter.

Another object of the invention is to provide a means for distributing crushed or flaked ice to a series of bins or other receptacles wherein the vegetables and perishable commodities are either stored or placed on display.

Another object of the invention is to provide a means for storing ice for immediate and convenient use and/or distributing it evenly throughout a display case for perishable items.

Another object is to provide a device for discharging ice from one or more storage bins over and between vegetables or other perishable foods.

A further object of the invention is to improve and dramatize the visible freshness of vegetables by directing a stream of flaked ice over and between the vegetables while displayed on grocery counters and the like.

Another object of the invention is to enhance and improve the display appearance of food articles, at the same time retaining the vital nourishment of vitamins within the vegetables such as iceberg lettuce and the like.

A further object is to provide a device which is readily adaptable to existing shelf equipment in large grocery stores.

A further object of the invention is to provide a distributing means which is economically installed and simple to manipulate.

Other and more specific objects of the invention will become more apparent on perusal of the following specifications in conjunction with the accompanying drawings wherein Fig. 1 is a front elevation partly broken away of the ordinary vegetable counter with our improved method and device applied thereto.

Fig. 2 is a vertical section of the apparatus depicted in Fig. 1.

Fig. 3 is a transverse section of the device.

Fig. 4 is a sectional detail on the line 4—4 of Fig. 3.

Fig. 5 is a plan view of a super market showing our improved installation in position to be viewed through the store window.

Figure 6:
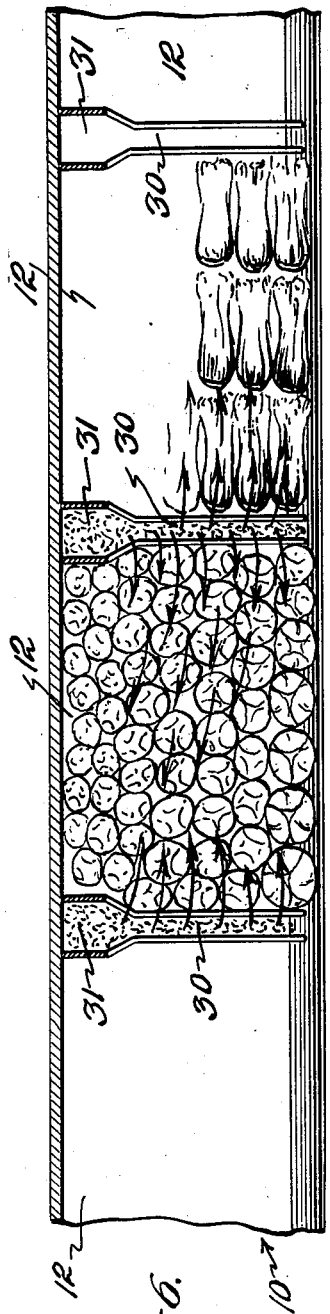
Fig. 6 is a partial sectional detail on the line 6—6 of Fig. 3.

In accordance with the present invention, we provide a structure and means for distributing crushed or flaked ice to a plurality of display cases or other receptacles. The device is so arranged that the flaked ice is deposited on a conveyor element and delivered to convenient troughs disposed immediately adjacent or between the respective display cases. Also, we utilize a control mechanism associated with the distributing arrangement for automatically shutting off the supply when an adequate amount of ice has been deposited in the respective distributing stations or directly onto and around the vegetables while displayed on the shelves as desired. The source of ice may consist in a flaked ice machine or a suitable storage bin from which manufactured ice is continuously or periodically delivered to the conveyor element.

Referring to the drawings, it will be seen that we have shown for explanatory purposes a number of illustrative embodiments of the invention. It will be understood that these specific structures may be altered materially and that the means herein described for achieving the desired results are purely illustrative and may be substantially varied without departing from the spirit and scope of the present invention.

In general, the numeral 10 depicts a vegetable display counter of the type used in large grocery stores and super-markets having the usual angular mirrors 11 which amplify the appearance of the vegetables displayed in a plurality of shelves or racks 12. As usual, the cabinet 10 is formed with an elongated compartment 13 providing a normally unused space immediately in back of the reflectors or mirrors 11. We may utilize this space in the following manner.

At the right side of the series of counters is a source of flaked or crushed ice such as a flaked ice machine 14 of the revolving drum type which during operation continuously delivers a stream of ice into a shoot 15 and onto the end of an elongated conveyor belt 16 extending the entire length of the cabinet 10 and mounted within the compartment 13 on rollers 17 and 18. These rollers 17 and 18 have studs 19 which are journalled into the opposing side walls of the cabinet in the compartment 13. The roller 18 and conveyor belt 16 are driven through a reduction gear 20 as shown in Fig. 4 by a motor 20a which is connected into a circuit associated with a thermostatic control 21. The lower web of the belt 16 is provided with a number of rotatable clover supports 22 mounted on transverse shafts 23 as shown in Fig. 2. The flaked ice is delivered from the shoot 15 onto the conveyor belt 16 which has a plurality of transverse projections 24 and moved from right to left within the compartment 13, and finally delivered into an ice storage compartment 25 at the opposite end of the belt having a window 26 visible for display purposes through the store window.

The compartment 13 is formed with a number of bins 27 preferably corresponding with the number of vegetable bins in the cabinet 10 to which the flaked ice is delivered by the conveyor belt 16. The entire compartment 13 including the bins 27 is lined with stainless steel, aluminum or other suitable metal 13a.

When reserve storage compartment 25 is filled with flaked ice, the surplus ice from the top of the compartment is successively moved along and deposited into the series of ice bins 27 in the following manner. When the first compartment 27 becomes filled, the projections 24 then carry surplus ice from the top of the compartment into the succeeding compartment 27 and so on along the entire series of ice bins until the last bin is filled whereupon the thermostat 21 becomes operative to disconnect the circuit to the ice machine 14 and the motor 20a.

It is apparent that the ice from the several bins 27 as needed is withdrawn from the bottom of the bin through an outlet 28 provided with a sliding trap 29. Disposed between the vegetable bins 12 are a plurality of troughs 30 as shown in Fig. 6, having a flared inlet 31 into which the flaked ice is deposited from the several bins 27. The ice slides down the troughs 30 and spills over into the vegetables contained on either side of the troughs. If desired, each of the flaked ice bins 27 may be equipped with a thermostat and the several thermostats connected in series with the motor 20 and the flaked ice machine control so that when the ice level in any bin falls below the thermostat, the motors become operative to refill that bin so that each bin is completely filled at all times. A single control as shown is usually sufficient to provide an adequate supply of ice in the respective bins 27. The flaked ice in the troughs 30 may be distributed or scattered periodically by the attendant or automatically over the vegetables in the display racks 12 so that they are always chilled in an environment of flaked ice and kept in a fresh and saleable condition. If desired, the traps 29 may be removed and the machine 14 and conveyor 16 operated at a suitable speed so that flaked ice is continuously and automatically supplied directly to the troughs 30 and over the vegetables in the racks 12.

Figure 7:
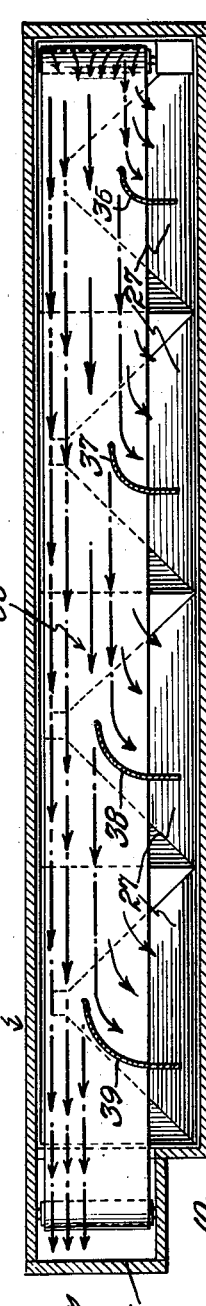
Figs. 7 and 8 show modified forms of the invention.

The modification of Fig. 7 utilizes a simple form of conveyor belt 35, the ice being deposited from shoot 15 on the right side of the belt 35 and conveyed along over the series of bins 27 to the several stations above the bins which have deflecting members 36, 37, 38, and 39 progressively extending further across the conveyor belt 35 as shown in the drawing. Thus, the deflector 36 directs that increment of ice adjacent the edge of the belt 35 into the initial bin 27 and the succeeding deflectors direct ice disposed nearer the center of the belt 35 and on the opposite side into the respective bins as will be readily apparent. The ice machine may be operated periodically by the thermostatic means described in the first embodiment.

Figure 8:
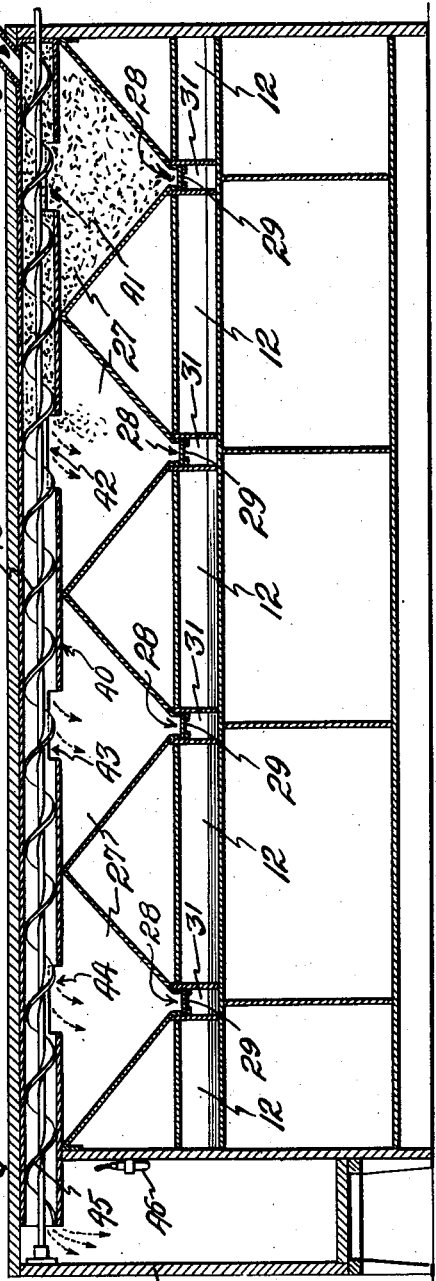

Fig. 8 shows another modification comprising an elongated tubular member 40 having openings 41, 42, 43 and 44 above each of the bins 27. A screw conveyor 45 carries the flaked ice coming down the shoot 15 along the tube 40 successively depositing the flaked ice into the bins 27 along the length of the cabinet 10 until the several bins are filled with ice whereupon the thermostatic element 46 becomes operative to disconnect the circuit to the flaked ice machine and the motor which drives the conveyor screw.

In accordance with the present invention, a valuable apparatus and method has been devised for efficiently operating a vegetable counter of the chain store type so that the vegetables are always kept in a fresh and chilled condition while displayed on counters to customers. The commodities are thereby rendered more saleable since the appearance of the flaked ice itself distributed around and among the vegetables gives a wholesome and fresh appearance.

The vegetables or other perishable food products may, if desired, be dispensed and sold from the counters in absolutely fresh condition by means of insulated bags or other wrappers also containing a supply of flaked ice to maintain the freshness of the perishables until they are deposited in the refrigerator by the consumer.

It will be appreciated that the entire arrangement may be situated in such a manner that the iced vegetables and stream of ice entering the storage compartment 25 may be visible from the exterior store window of the super-market for attracting attention and arousing curiosity of window shoppers to investigate the display and shop. This enables special displays and more dramatic appeal to the housewife and serves to advance the use of flaked ice by keeping food values in perishable foods. It also provides a complete refrigeration service from the grower to domestic refrigerator or table.

A source of flaked ice supply may be used in the apparatus, supplied periodically by flaked ice from a manufacturer in place of the flaked ice machine which would deliver ice to the conveyor mechanism for distribution to the plurality of racks as previously described. These and other changes may be made in the apparatus without departing from the spirit and scope of the invention as defined in the following claims.

We claim:

1. Apparatus for the refrigeration of vegetables and other commodities comprising a source of flaked ice and a plurality of racks for displaying vegetables disposed in series on a store counter, conveyor means for directing a stream of flaked ice from the source to the series of racks and means for controlling a sufficient flow of ice to the several racks to maintain the vegetables in a refrigerated condition.

2. Apparatus for the refrigeration of vegetables and other commodities comprising a source of flaked ice and a plurality of racks in series for displaying vegetables on a store counter, conveyor means for the flaked ice disposed above and in parallel with the series of racks, and means for directing the ice from the conveyor means to the series of vegetable racks to maintain the vegetables in a refrigerated condition.

3. Apparatus for the refrigeration of vegetables and other commodities comprising a source of flaked ice and a plurality of racks in series for displaying vegetables on a store counter, a conveyor mechanism for the flaked ice disposed above and in parallel with the series of racks, and means associated with the conveyor mechanism for directing a portion of the flaked ice to each of the vegetable racks.

4. Apparatus for the refrigeration of vegetables and other commodities comprising a source of flaked ice and a plurality of racks in series for displaying vegetables on a store counter, a conveyor mechanism for the flaked ice disposed above and in parallel with the series of racks, and a deflecting device for directing a stream of the flaked ice onto the respective vegetable racks to maintain the vegetables in a refrigerated condition.

5. Apparatus for the refrigeration of vegetables and other commodities comprising a source of flaked ice and a plurality of racks in series for displaying vegetables on a store counter, a conveyor belt for depositing ice into the last vegetable rack and means mounted on the conveyor belt for distributing ice successively along the series of vegetable racks and means for stopping the conveyor belt when an adequate supply of ice for refrigeration purposes is provided in the vicinity of each of the racks.

6. Apparatus for the refrigeration of vegetables and other commodities comprising a source of flaked ice and a plurality of racks in series for displaying vegetables on a store counter, a conveyor mechanism for the flaked ice disposed above and in parallel with the series of racks, and a deflector disposed adjacent each of the vegetable racks for directing a portion of the ice from the conveyor belt into the respective rack to maintain the vegetables therein refrigerated.

7. Apparatus for the refrigeration of vegetables and other commodities comprising a source of flaked ice and a plurality of racks in series for displaying vegetables on a store counter, a conveyor mechanism for the flaked ice disposed above and in parallel with the series of racks, a container for the flaked ice extending along the length of the conveyor mechanism and openings in the container for directing ice into each of the racks.

8. Apparatus for the refrigeration of vegetables and other commodities comprising a flaked ice machine and a vegetable counter including a plurality of racks for the vegetables, a conveyor for carrying the flaked ice from the machine to the vicinity of each of the vegetable racks, a series of storage bins for the flaked ice disposed adjacent to the vegetable racks, means for depositing flaked ice from the conveyor mechanism into each of the bins, means for discharging flaked ice from each of the bins onto the racks and means for shutting off the supply of ice when an adequate supply of ice for refrigeration purposes is contained in said bins.

9. A method for the preservation of fresh vegetables and similar perishable commodities which comprises arranging fresh vegetables in a series of racks for display purposes, conveying flaked ice from a supply source along and above the series of display racks and directing a portion of the flaked ice so conveyed into each of the said containers to maintain the contents thereof in a refrigerated condition.

10. Apparatus for the refrigeration of vegetables and other commodities comprising a source of flaked ice and a vegetable container including a plurality of racks for the vegetables, a series of communicating bins for flaked ice disposed adjacent to the vegetable racks, an endless motor driven conveyor belt for the flaked ice extending along and above the series of storage bins, means associated with the conveyor belt for scooping flaked ice from a full bin to a succeeding bin and a thermostat for shutting off the flow of ice when an adequate supply of ice for refrigeration purposes has been deposited in said bins.

ALEXANDER L. MUNSON.
ROY C. FOLLETT.

REFERENCES CITED

The following references are of record in the file of this patent:

UNITED STATES PATENTS

| Number | Name | Date |
| --- | --- | --- |
| 2,005,558 | Post | June 18, 1935 |
| 2,303,724 | Conrad | Dec. 1, 1942 |
| 2,337,600 | Harris | Dec. 28, 1943 |